OR X 866 MENTS.
BEST AVAILABLE COPY
SUBSTITUTE FOR MISSING OR X 866
X866
PATENTED APR. 29, 1808.
B. DEARBORN.
ANGLET.
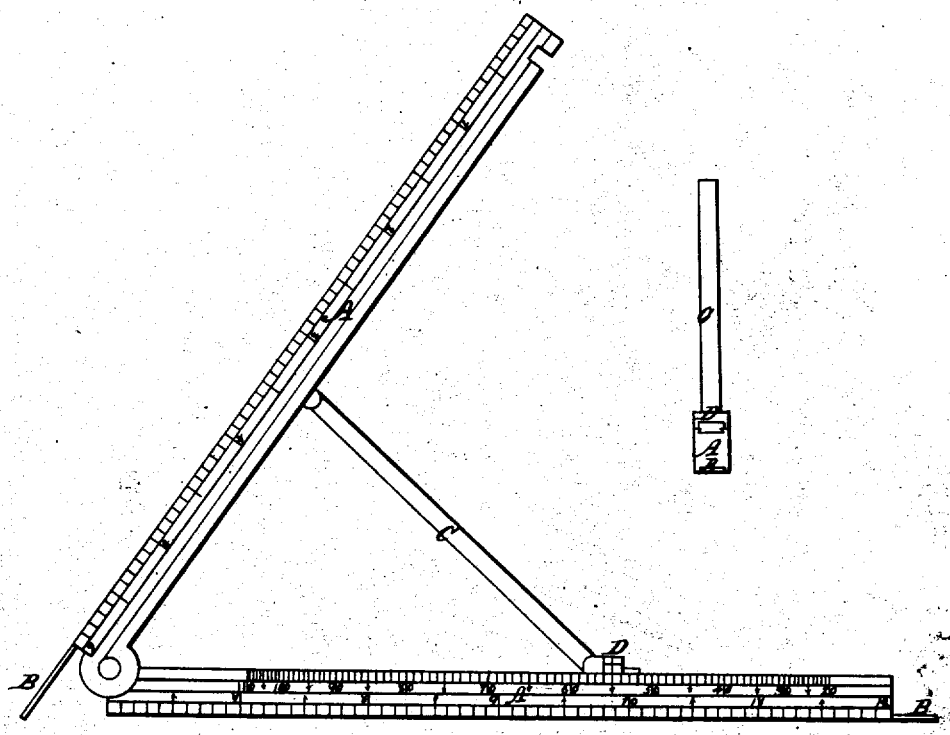

8660x Apl. 29. 1808 [illegible]

Benjamin Dearborn of Massachusetts

Letters Patent.

The Schedule referred to in these Letters Patent and making part of the same containing a description in the words of the said Benjamin Dearborn himself of his Instrument called the Anglet This instrument consists of the following parts viz. 1st Two bars or legs united by a joint in such a manner as to open and shut like a jointed Rule. 2dly An index made to slide on or in one of the bars or legs before mentioned. 3d A Brace the two ends of which turn on two pins one end being thereby attached to one of the legs & the other to the index. To the foregoing the following subordinate parts are added or omitted as may be expedient. 1st A ruler or rulers sliding in one or both of the legs above mentioned. 2d a Spirit level, water level, or plumb line. 3d A small arch of a circle to ascertain the distance or number of degrees at which the instrument is opened before the index will note the degrees with accuracy. 4th A magnetic needle and proper sights for the purpose of surveying land &c. On that leg where the index moves a scale is laid down on one or both sides. Shewing by means of the index at what angle the instrument is open at any degree from the lowest to the highest marked thereon. On other parts [illegible] the instrument scales of inches and such other scales may be added as shall be required for mathematical calculations or measurements in any way in which the Sector, Gunter Scale, or sliding Rule, or common rule can be applied. This instrument may be made of Ivory, Brass, Metal or wood, or any of those materials may be united therein: and it may be of any size required to suit the purposes for which it is wanted. The largest which has yet been made is five feet radius opening to a ten feet pole the smallest six inches radius opening to a twelve inch Rule. In addition to the purposes above described for which the anglet may be used, it may also be graduated with a scale of equal parts on the in

8664X

[illegible] edge of an [illegible] corresponding with a similar scale on the other leg
and a sliding square or right angle applied thereto will ascertain
the latitude and departure of a Ship's course. But a different in-
strument has long been known with a sliding square applied to
the same purpose. Therefore the application of the square in this way
is not considered as being secured by the exclusive right of this Patent.

Ent.
[illegible] Witnesses { William Thornton
[illegible] Rogers

Benjamin Dearborn

Drawing made P. F.

(480 words)

(Patented April 29 1808).